United States Patent Office

3,667,969
Patented June 6, 1972

3,667,969
ARTIFICIAL SWEETENING COMPOSITION
Paul Kracauer, New York, N.Y., assignor to American Sweetener Corp., New York, N.Y.
No Drawing. Continuation-in-part of application Ser. No. 808,984, Mar. 20, 1969. This application Sept. 28, 1970, Ser. No. 76,216
Int. Cl. A23l 1/26
U.S. Cl. 99—141 A
10 Claims

ABSTRACT OF THE DISCLOSURE

The bitter after-taste characteristic of artificial sweetening compositions is eliminated by a composition comprising a major amount of saccharin and minor amounts of d-galactose. The flavor of the sweetening composition may be further improved by the addition of small amounts of sodium chloride and/or calcium hydroxide.

---

This application is a continuation-in-part of copending patent application Ser. No. 808,984, filed Mar. 20, 1969 and now abandoned.

The present invention relates to artificial sweetening compositions. More particularly, the present invention is concerned with novel, low calorie artificial sweetening compositions which employ soluble saccharin compounds as the source of sweetness.

The utilization of saccharin as an artificial sweetener is well known in the art. While this compound is advantageously used in lieu of sugar as a low calorie sweetener, it has been characterized by a bitter aftertaste. Attempts have been made to overcome this objectionable aftertaste by combining saccharin with blocking or flavoring agents. However, such combinations have the effect of diminishing the sweetening power of saccharin. The bitter aftertaste of saccharin has been successfully masked by combining saccharin with cyclamates. However, the latter compounds are now under investigation as a health hazard and their use in sweetening compositions is no longer favored.

It is an object of the present invention to provide a novel low calorie artificial sweetening composition.

It is another object of the present invention to provide a novel low calorie sweetening composition employing saccharin as the main source of sweetener.

Yet another object of the present invention is to provide a novel low calorie sweetening composition which employs saccharin as the sweetener but which lacks the aftertaste normally associated with this compound.

The above and other objects of the invention are accomplished by a novel composition comprising a major amount of a soluble saccharin compound and a minor amount of d-galactose. It has been discovered that the utilization of small amounts of d-galactose in combination with saccharin eliminates the bitter aftertaste normally associated with saccharin without reducing the sweetening power of saccharin. The novel composition is completely soluble and will readily dissolve in hot or cold foods and drinks. A further feature of the invention is the discovery that the addition of small amounts of sodium chloride and/or calcium hydroxide to the above described novel composition further enhances its flavor.

Preferably, 20 to 50 parts of d-galactose will be mixed with 100 parts of saccharin in order to produce the nonbitter, low calorie, artificial sweetening composition of the invention. However, somewhat smaller or larger amounts of d-galactose may be employed without detracting from the effectiveness of the resulting composition. It has been found that the utilization of amounts of d-galactose in excess of the amount of saccharin may not only eliminate the aftertaste normally associated with saccharin but also could effectively reduce or eliminate the sweetness of this compound.

While the d-galactose-saccharin composition of the invention may be used alone it is a further feature of the invention that selected additional ingredients be employed either alone or in combination to produce a sweetening composition having an enhanced flavor, i.e., a more sugar-like taste, in foods and drinks. Thus, for example, it has been discovered that the addition of 10 to 40 parts of sodium chloride for each 100 parts of saccharin creates a more sugar-like taste in foods and drinks. It has also been discovered that the flavor of the novel sweetening composition may be enhanced by incorporating 1 to 5 parts of calcium hydroxide in the composition for each 100 parts of saccharin. In a preferred embodiment of the invention, the artificial sweetening composition will comprise a combination of 100 parts saccharin, 20 to 50 parts d-galactose, 10 to 40 parts sodium chloride and 1 to 5 parts calcium hydroxide. This combination produces a very pleasant sugar-like taste without materially increasing the number of calories over that associated with saccharin.

Although it is not critical to the present invention, the artificial sweetening composition of the invention is advantageously combined with a bulking agent. The utilization of bulking agents is desirable since the sweetening power of saccharin is quite concentrated, i.e., 1 part of saccharin is equal to about 350–400 parts of sugar, and in the absence of a bulking agent normal servings of the artificial sweetener would be quite small. Any edible, soluble material which will not adversely affect the basic sweetening compound or the food or drink to be sweetened may be employed as a bulking agent. Typical bulking agents include carbohydrates such as sucrose, dextrose, sorbitol. Normally about 0.7 to 1.0 gram of the bulking agent will be added to the sweetening composition of the invention in order to create an individual portion equal in sweetening power to about two teaspoons of sugar. Although the utilization of such bulking agents will add a small amount of calories to the composition, the amounts utilized on an individual serving basis will add only about 3 calories as compared to the 35–40 calories which would be present if sugar were used as the sweetener.

Although the composition of the invention may be formulated by skillfully blending the materials into a uniform mix, the preferred method of formulation is a conventional wet granulation technique. The wet granulation technique results in a fluffier composition which offers mode volume and consequently is more convenient to dispense. In the typical wet granulation technique all of the ingredients are carefully mixed and thereafter are wet granulated using about 1–2% of a 50% alcohol solution. The wet granulated mixture is then dried at low temperature and sifted to obtain the desired uniform crystal granulate.

The characteristics of the present invention will be further understood by reference to the following illustrative examples.

EXAMPLE 1

The following ingreidents are skillfully mixed and uniformly blended:

| | Grams |
|---|---|
| Soluble saccharin | 3,000 |
| d-Galactose | 1,000 |
| Sodium chloride | 800 |
| Calcium hydroxide | 60 |

Approximately 0.049 gram of this mixture is equivalent in sweetening power to about 10 grams of sugar. It is completely and instantly soluble in cold and hot foods and drinks.

EXAMPLE 2

The following ingredients were uniformly mixed and blended:

| | Grams |
|---|---|
| Soluble saccharin | 310 |
| d-Galactose | 110 |
| Sodium chloride | 90 |
| Sugar | 7,500 |

About 0.8 gram of this mixture has the approximate sweetening power of two teaspoons of sugar.

EXAMPLE 3

The following ingredients were uniformly mixed:

| | Grams |
|---|---|
| Soluble saccharin | 3,000 |
| d-Galactose | 900 |
| Sodium chloride | 800 |
| Calcium hydroxide | 70 |
| Sugar | 90,000 |

The above mix was wet granulated using about 1–2% of a 50% alcohol solution. The mixture was thereafter dried at a low temperature and sifted to obtain a uniform crystal granulate. Approximately 0.94 gram of the above very light composition is equivalent in sweetening power to about 9–11 grams of sugar.

EXAMPLE 4

The following ingredients were uniformly mixed:

| | Grams |
|---|---|
| Soluble saccharin | 3,200 |
| d-Galactose | 1,400 |
| Calcium hydroxide | 80 |

When about 0.5 gram is dissolved in a 12-ounce serving of a carbonated, flavored drink the drink will be as sweet as it would have been if sweetened with about 10 grams of sugar.

EXAMPLE 5

The following ingredients were uniformly mixed:

| | Grams |
|---|---|
| Soluble saccharin | 3,000 |
| d-Galactose | 110 |
| Dextrose | 85,000 |

Approximately 0.841 gram of this mixture is equivalent in sweetness to about 10 grams of sugar.

EXAMPLE 6

The following ingredients were uniformly mixed

| | Grams |
|---|---|
| Soluble saccharin | 3,100 |
| d-Galactose | 1,000 |
| Sodium chloride | 900 |
| Calcium hydroxide | 84 |
| Sorbitol | 75,000 |

When 0.812 gram of the above blend is dissolved in a 4-ounce orange drink its sweetness is equivalent to a sweetened orange drink containing 10 grams of sugar or approximately 0.34 gram of a soluble cyclamate.

Having thus described the general nature as well as specific embodiments of the invention the true scope will now be pointed out in the appended claims.

What is claimed is:

1. An artificial sweetening composition comprising a major amount of soluble saccharin and a minor amount of d-galactose, said d-galactose being present in an amount sufficient to eliminate the aftertaste of said saccharin.

2. The composition of claim 1 wherein 20 to 50 parts of said d-galactose are present for each 100 parts of said saccharin.

3. The composition of claim 2 further including a carbohydrate bulking agent.

4. The composition of claim 3 wherein said carbohydrate bulking agent is selected from the group consisting of sucrose, dextrose and sorbitol.

5. The composition of claim 2 further including 10 to 40 parts of sodium chloride for each 100 parts of said soluble saccharin.

6. The composition of claim 5 further including a carbohydrate bulking agent.

7. The composition of claim 2 further including 1 to 5 parts of calcium hydroxide for each 100 parts of said soluble saccharin.

8. The composition of claim 7 further including a carbohydrate bulking agent.

9. The composition of claim 2 further including 10 to 40 parts of sodium chloride and 1 to 5 parts of calcium hydroxide for each 100 parts of said soluble saccharin.

10. The composition of claim 9 further including a carbohydrate bulking agent.

References Cited

UNITED STATES PATENTS

| | | | |
|---|---|---|---|
| 2,570,272 | 7/1949 | Pilcher | 99—141 |
| 3,011,897 | 12/1961 | Grosvenor | 99—141 |
| 3,409,441 | 11/1968 | Bouchard et al. | 99—28 |

FOREIGN PATENTS

| | | | |
|---|---|---|---|
| 977,482 | 12/1964 | Great Britain | 99—141 A X |

RAYMOND N. JONES, Primary Examiner

R. B. ANDEWELT, Assistant Examiner